(12) United States Patent
Lee

(10) Patent No.: US 7,103,584 B2
(45) Date of Patent: Sep. 5, 2006

(54) ADAPTIVE MIXTURE LEARNING IN A DYNAMIC SYSTEM

(75) Inventor: Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 10/192,964

(22) Filed: Jul. 10, 2002

(65) Prior Publication Data

US 2004/0010527 A1 Jan. 15, 2004

(51) Int. Cl.
*G06F 15/18* (2006.01)

(52) U.S. Cl. .............................. 706/14; 706/20; 706/22; 382/103

(58) Field of Classification Search ................... 706/14, 706/45, 22, 20 TXT, 20 SC; 704/256.7; 382/103 TXT
See application file for complete search history.

(56) References Cited

U.S. PATENT DOCUMENTS 5,761,383 A * 6/1998 Engel et al. ................... 706/14
6,879,705 B1 * 4/2005 Tao et al. ..................... 382/103

OTHER PUBLICATIONS

"On-line EM algorithm and reconstruction of chaotic dynamics" by Shin Ishii and Masa-aki Sato, Neural Networks for Signal Processing VIII, 1998. Proceedings of the 1998 IEEE Signal Processing Society Workshop, Aug. 31-Sep. 2, 1998 pp. 360-369.*

"Bayesian self-organising map for Gaussian mixtures" by Yin, H.; Allinson, N.M.; Vision, Image and Signal Processing, IEE Proceedings-vol. 148, Issue 4, Aug. 2001 pp. 234-240.*

"Hand Gesture Recognition using Input-Output Hidden Markov Models" by Sebastien Marcel, Olivier Bernier, Jean-Emmanuel Viallet and Daniel Collobert, www-prima.inrialpes.fr/fg2000/program/40.html.*

"Adaptive video background modeling using color and depth", Harville, M.; Gordon, G.; Woodfill, J.; Image Processing, 2001. Proceedings. 2001 International Conference on vol. 3, Oct. 7-10, 2001 pp. 90-93 vol. 3.*

P. KaewTraKulPong et al., An Improved Adaptive Background Mixture Model for Real-time Tracking with Shadow Detection, Proc. 2nd European Workshop on Advanced Video Based Surveillance Systems, AVBS01, Sep. 2001, pp. 1-5, Kluwer Academic Publishers.

Dempster et al. "Maximum Likelihood from Incomplete Data via the EM Algorith," Journal of the Royal Statistical Society 39:1-38 (1977).

Elgammal et al. "Non-parametric Model for Background Subtraction," Sixth European Conference on Computer Vision (2000).

(Continued)

*Primary Examiner*—Wilbert L. Starks
*Assistant Examiner*—Mai T. Tran
(74) *Attorney, Agent, or Firm*—Townsend and Townsend and Crew LLP

(57) ABSTRACT

An online Gaussian mixture learning model for dynamic data utilizes an adaptive learning rate schedule to achieve fast convergence while maintaining adaptability of the model after convergence. Experimental results show an unexpectedly dramatic improvement in modeling accuracy using an adaptive learning schedule.

19 Claims, 5 Drawing Sheets

OTHER PUBLICATIONS

Friedman et al. "Image Segmentation in Video Sequences: A Probabilistic Approach," Proceedings of the Thirteenth Conference of Uncertainty in Artificial Intelligence (1997).

Harville et al. "Foreground Segmentation Using Adaptive Mixture Models in Color and Depth," IEEE Workshop on Detection and Recognition of Events in Video, pp. 3-11, (2001).

Khan et al. "Tracking People in Presence of Occlusion," Asian Conference on Computer Vision (2000).

Neal et al. "A New View of the EM Algorithm that Justifies Incremental and Other Variants," *Learning in Graphical Models*, Kluwer Academic Publishers, M. I. Jordan ed., pp. 355-368, (1998).

Nowland "Soft competitive adaptation: Neural network learning algorithms based on fitting statistical mixture," Ph.D. dissertation, Carnegie Mellon University (1991).

Sato et al. "On-line em algorithm for the normalized gaussian network," Neural Computation 12:407-432 (2000).

Stauffer et al. "Learning Patterns of Activity Using Real-Time Tracking," IEEE Transactions on Pattern Analysis and Machine Intelligence 22:747-757 (2000).

Stauffer et al. "Adaptive background mixture models for real-time tracking," Proceedings. 1999 IEEE Computer Society Conference on Computer Vision and Pattern Recognition, IEEE Comput. Soc. Part vol. 2, (1999).

Wren et al. "Pfinder: Real time tracking of the human body," IEEE Transactions on Pattern Analysis and Machine Intelligence 19:7780-785 (1997).

Yang et al. "Multimodal People ID for a Multimedia Meeting Browser," Proceedings of ACM Multimedia (1999).

Yang et al. "A Real-Time Face Tracker," Proceedings of WACV, pp. 142-147 (1998).

* cited by examiner

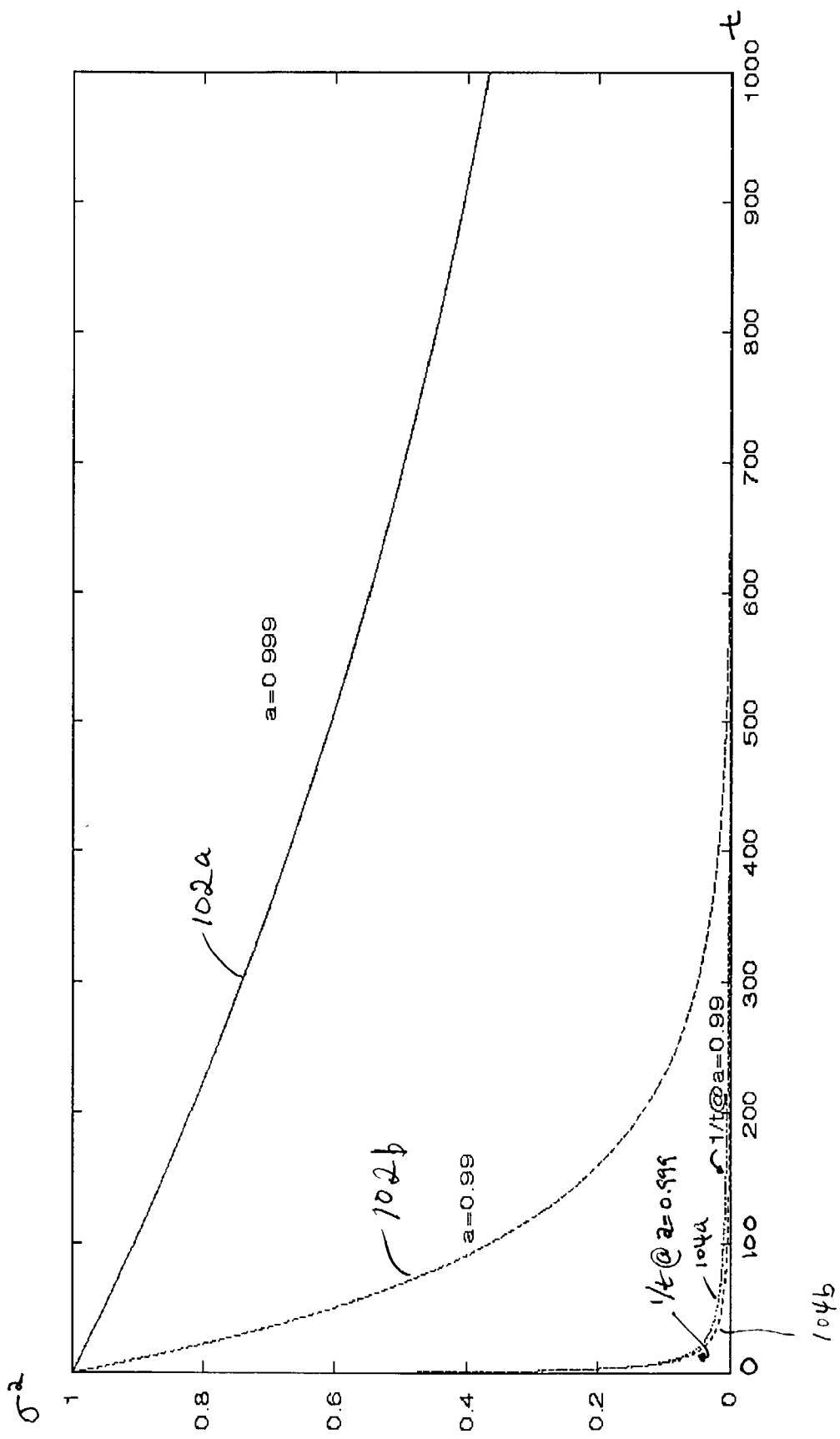

Figure 1 - An illustration of the relative convergence rates for different learning rate schedules assuming a constant data value is observed over time. Convergence is dramatically faster using a 1/t schedule than with a fixed rate. While convergence rate can be increased using a smaller retention factor under fixed rate learning, the model will lose stability.

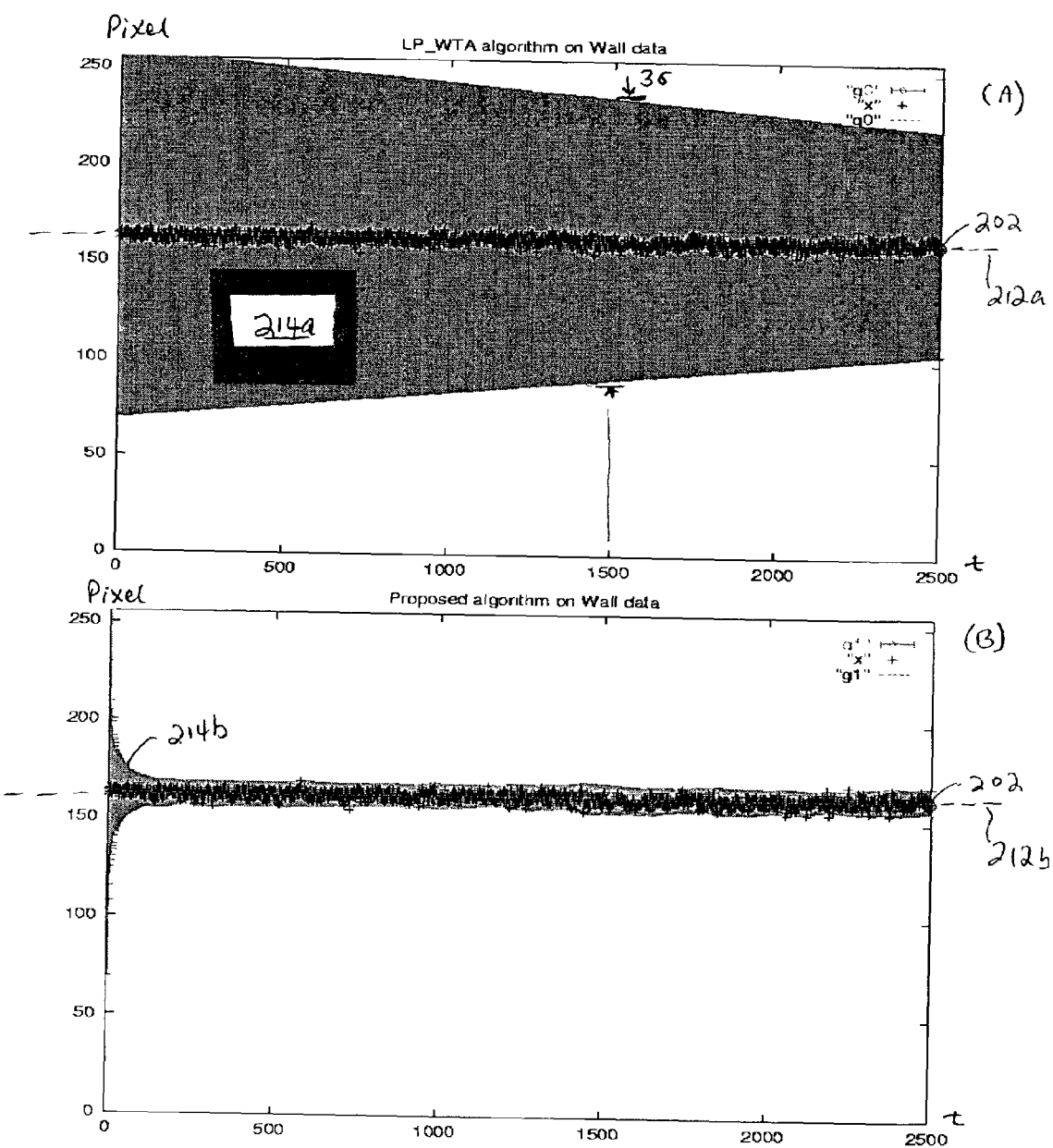
Figure 2 – A comparison of two algorithms on wall data. The values of the "red" component of a pixel, shown in the y axis, are plotted against time. While the center of one of the Gaussians followed the data quite well over time in both algorithms, the variance converged much faster with the algorithm of the present invention (bottom).

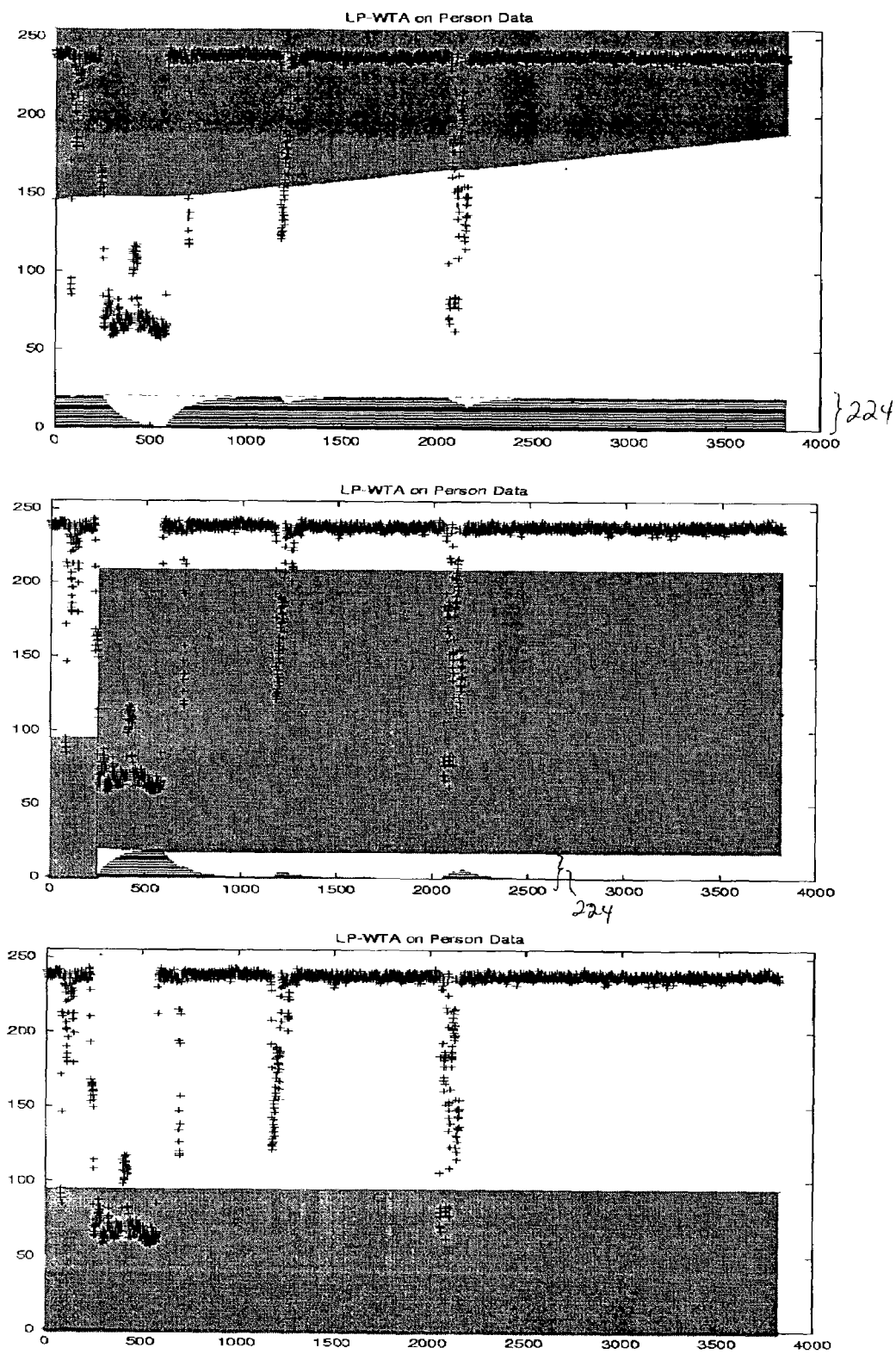
Figure 3 — Performance of the basic adaptive filter algorithm on Person data. Pixel values (y-axis) observed over 4000 frames are plotted. The mean and variance for each of the three Gaussians in the mixture are shown in separate graphs. The relative importance of each Gaussian (mixing weight) is indicated at the bottom of the graphs.

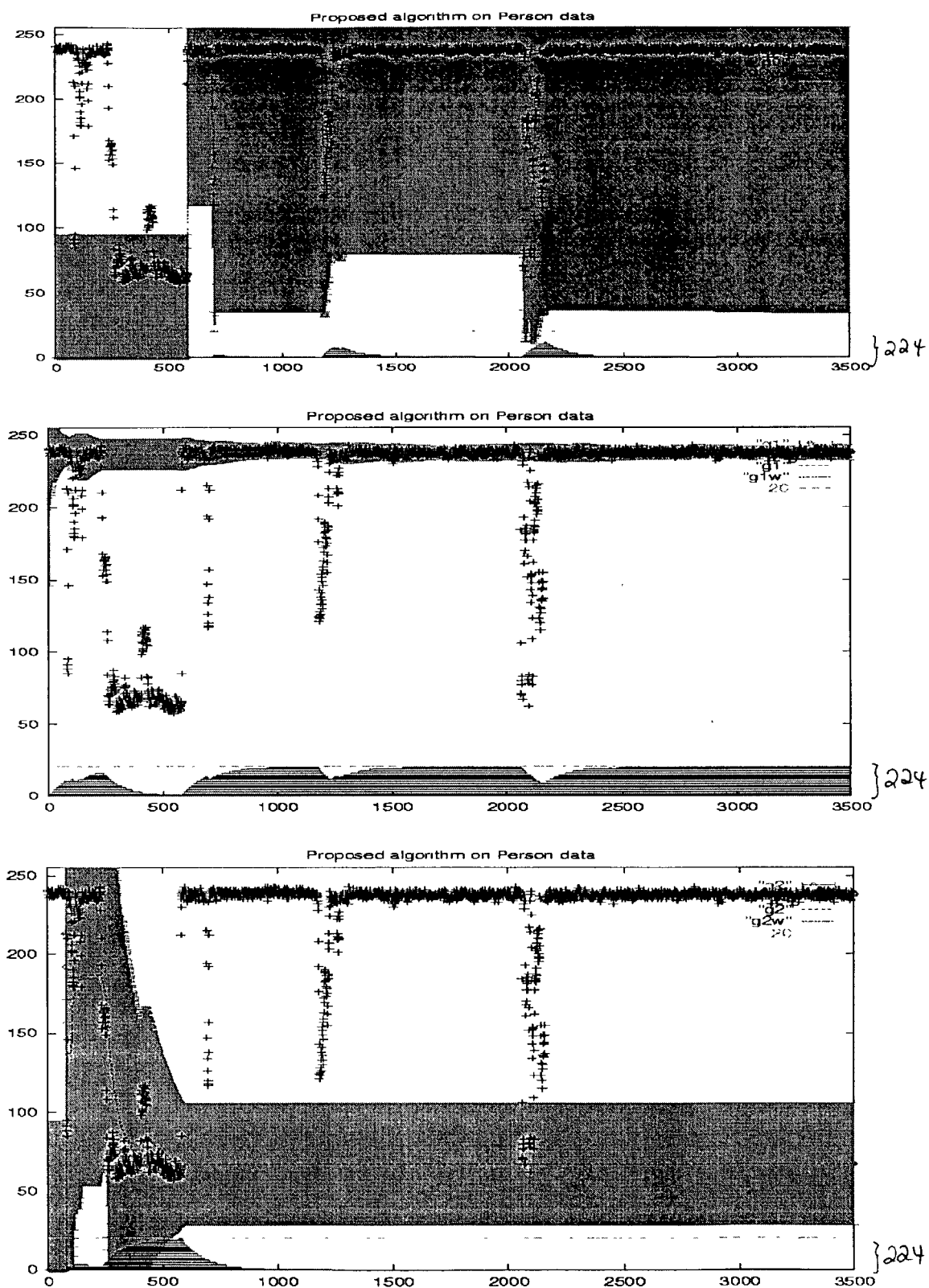
Figure 4 – Performance of the proposed learning algorithm on Person data. Compared to Figure 3, it is obvious the Gaussian parameters converged much faster and approximated the data better.

ADAPTIVE MIXTURE LEARNING IN A DYNAMIC SYSTEM

BACKGROUND OF THE INVENTION

The present invention relates generally to data modeling and in particular to modeling methods and systems using Gaussian mixtures.

Gaussian mixture is commonly used in parametric estimation of density functions and in unsupervised clustering. While the batch learning process of these models on stationary distribution is well understood and can be solved using the EM (expectation minimization) algorithm, there are increasing interests in developing online learning algorithms on dynamic data. The demand for such algorithms comes from real-time applications like video processing where a stream of new data is constantly being observed and the underlying data distribution may change over time.

Current solutions reported in the literature use adaptive filter learning to track slow distribution shifts, and handle sudden distribution changes through Gaussian reassignments. Ever since the original proposal of using Gaussian mixtures for modeling pixel distributions in video signals, the conventional approaches have followed the formulation presented by Stauffer, C. and Grimson, W. E. L., *Adaptive Background Mixture Models for Real-time Tracking*, Proc. CVPR, Vol. 2, pp 246–252, June 1999. At each step, parameters of one (or more, depending on the selection criteria) of the Gaussians that best match the new observation x are updated using a recursive filter $\theta(t)=(1-\alpha)\cdot\theta(t-1)+\alpha\cdot\hat{\theta}(x;t)$, where $\alpha$ controls the temporal rate of adaptation (also referred to as the "learning factor", $\alpha$). If x does not match the current model well, then one of the Gaussians is reassigned to the new point. Through recursive filter learning and Gaussian reassignment, the system is able to model dynamic distributions. Unfortunately, convergence is very slow using this strategy, requiring the distribution to remain stationary for a long time to allow the system to achieve an acceptable approximation.

While recursive filter learning is necessary to track distribution changes, a more efficient strategy can be used to speed up convergence during initial parameter estimation. Such a strategy was proposed by Kaew TraKulPong, P. and Bowden, R., *An Improved Adaptive Background Mixture Model for Real-time Tracking with Shadow Detection*, Proc. of $2^{nd}$ European Workshop on Advanced Video Based Surveillance Systems, September 2001. Kaew et al. proposed separating the learning process into discrete stages. By storing sufficient statistics of the first L samples in the early learning stage and applying the appropriate term weighting, convergence can be improved. However, this explicit division of learning stages can only be applied at initialization. It has been observed that, in fact, subsequent Gaussian reassignment also suffers from slow convergence. In addition, a buffer is needed to store statistics of the previous L samples.

The requirement of stationarity of the distribution of data is at odds with the dynamic nature of a real time data. Data modeling of real time data such as audio streams and video requires an improvement on conventional data modeling techniques.

SUMMARY OF THE INVENTION

An adaptive filter apparatus and method performs data modeling using Gaussian mixtures. For each data point received from a data stream, one or more Gaussians are selected for updating. The updating is based on a time-adaptive learning schedule, wherein the learning rate starts at a value greater than a temporal retention factor $\alpha$ and which converges to $\alpha$ over time.

BRIEF DESCRIPTION OF THE DRAWINGS

FIG. 1 shows a comparison of convergence rates for different learning rate schedules;

FIG. 2 shows a comparison of learning using a prior art technique and a technique according to an embodiment of the present invention;

FIG. 3 illustrates the learning performance of a prior art adaptive filter on dynamic data;

FIG. 4 illustrates the learning performance of an adaptive filter according to an embodiment of the invention on the same dynamic data as shown in FIG. 3.

DESCRIPTION OF THE SPECIFIC EMBODIMENTS

A. Online Gaussian Mixture Learning

Figure 5:
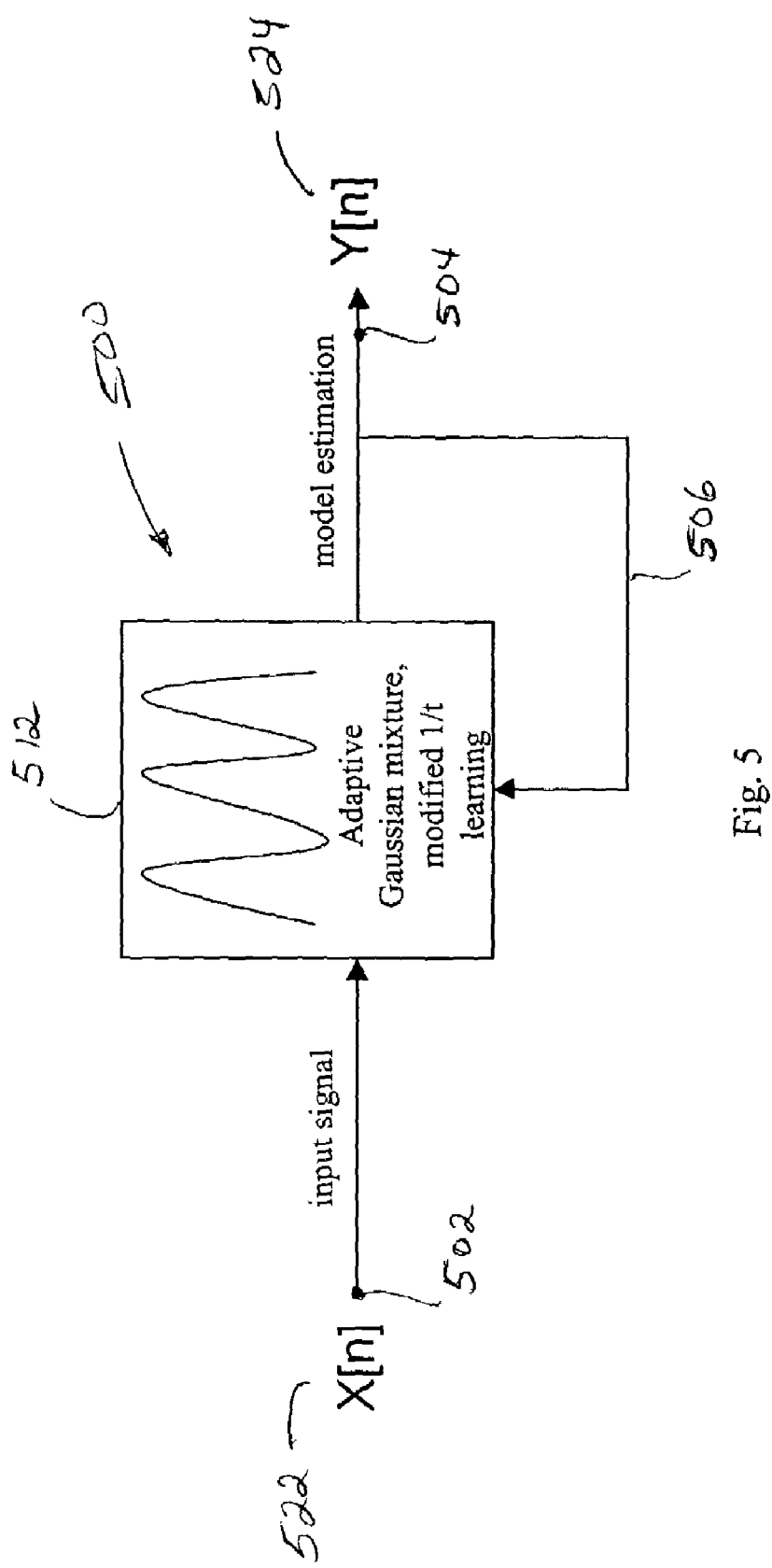
FIG. 5 shows a schematic representation of an adaptive filter in accordance with an embodiment of the present invention.

Referring to FIG. 5, a schematic representation of a data modeling filter apparatus 500 comprises a filter component 512. An input 502 receives an input data stream comprising the data X[n] 522 to be modeled. An output 504 produces a model Y[n] 524 representing the input data stream. A feedback loop 506 allows the filter to adaptively adjust the model in response to the incoming data stream. The filter component 512 operates in accordance with the process of the present invention. Typically, the filter component is a processing device, such as a digital signal processor (DSP), or a conventional CPU (central processing unit), executing appropriate software. The filter component can be an ASIC that processes data in accordance with the invention. It can be appreciated that the particular hardware and software configuration is not relevant to the invention. Any of a number of implementations can be realized by those of ordinary skill in the art. As will become clear, the invention is directed to a filter having a behavior appropriate for dynamic data modeling.

First, however, will be described the problem of Gaussian mixture modeling for real-time data and the basic online algorithm. Without loss of generality, let us refer to only a one-dimensional signal x(t). The goal is to represent the distribution of a stream of data points, seen one at a time, by a K-Gaussian mixture:

$$P(x(t)) = \sum_{k=1}^{K} w_k \cdot g_{k,t}(x)$$

$$w_{k,t} = P(G_{k,t}) \quad \therefore \sum_{k=1}^{K} w_k = 1$$

$$g_{k,t}(x) = P(x(t)|G_{k,t-1}) = \frac{1}{\sqrt{2\pi}\,\sigma_{k,t-1}} \exp\left(-\frac{1}{2}\frac{(x-\mu_{k,t-1})^2}{\sigma_{k,t-1}^2}\right).$$

The parameters being estimated include the weight, or mixing portion, $w_k$, the mean, $\mu_k$, and variance, $\sigma_k^2$, for each Gaussian. The subscript indicating time is sometimes omitted when there is no confusion. The basic online-EM (expectation minimization) algorithm updates these parameters upon observing a new datum x(t) using the steps outlined below:

Online-EM Mixture Learning Algorithm

| While get new data x | |
|---|---|
| If some Gaussian $G_k$ matches x | (1) |
| Update parameters of $G_k$ | (2) |
| If no Gaussians match x | |
| Select a Gaussian $G_k$ | (3) |
| Reinitialize $G_k$ with x | (4) |

It can be appreciated that different implementations in each of the foregoing pseudo-code steps will produce variations of the algorithm. For example, several definitions (criteria) are possible for the test "$G_k$ matches x" in Step (1). Most definitions are based on current estimates of $P(G_k|x)$ and some are based on a threshold metric. A "winner-take-all" approach utilizes a distance threshold to determine the most probable Gaussian:

$$M_k = \begin{cases} 1 & \text{if } \frac{|x-\mu_k|}{\sigma_k} < T_{\sigma}, \text{ and } k = \underset{j}{\arg\max}\{P(G_j|x)\} = \underset{j}{\arg\max}\{w_j \cdot g_k(x)\} \\ 0 & \text{otherwise} \end{cases}$$

The matching criteria can also be $P(G_k|x)$ itself, namely, $$p_{k,t}(x) = P(G_{k,t}|x(t)) = \frac{P(x(t)|G_{k,t})P(G_{k,t})}{P(x(t))} = \frac{g_{k,t}(x) \cdot w_{k,t}}{\sum_{k=1}^{K} g_{i,t}(x) \cdot w_{i,t}},$$

in which case each Gaussian matches every new data point and is updated by an amount relative to its distance from x. For computational efficiency, the winner-take-all version is often preferred over this kind of "soft partition" where each Gaussian is updated.

When one or more matching Gaussians have been found, their parameters are updated according to some updating rule(s) in Step (2). In many video processing applications, parameter updates model a causal low-pass filter such as:

$$\mu_k(t) = (1-\alpha) \cdot \mu_k(t-1) + \alpha \cdot x(t)$$
$$\sigma_k^2(t) = (1-\alpha) \cdot \sigma_k^2(t-1) + \alpha \cdot (x(t)-\mu_k(t))^2,$$

where $1/\alpha$ defines the effective time window of the low-pass filter. However, as mentioned before, this kind of fixed-rate adaptive filter learning adapts very slowly. A value between 0.01 and 0.001 is typically used for $\alpha$. The learning factor $\alpha$ is sometimes weighted by $P(x|G_k)$, or perhaps more appropriately by $P(G_k|x)$, to account for the fact that Gaussians closer to x should assume a larger responsibility for learning the point. A similar rule is used to update the weights:

$$w_k(t)=(1-\alpha) \cdot w_k(t-1)+\alpha \cdot (M_k-w_k(t-1)),$$

where M is 1 for Gaussians that matched x and 0 otherwise. This results in an increase in the weights for the matching Gaussians, and a decrease for the non-matching Gaussians. The weights are then renormalized so they sum to 1.

While the above updating rule is adequate for adapting slow changes in an established Gaussian, it cannot handle sudden changes in the distribution. Consequently, Steps (3) and (4) can be provided to accommodate such data. If none of the Gaussians matches x well enough, a new Gaussian should be assigned to it. If all K Gaussians have been used, one of the existing Gaussians needs to be reassigned. Reassignment of a Gaussian is a practical consideration. Ideally, a new Gaussian should be assigned; however, using an unbounded number of Gaussians is impractical from an implementation point of view since there is usually limited storage capacity. Hence, reassignment of Gaussians is performed.

One obvious choice for selecting the Gaussian for reassignment in Step (3) is to base the selection on the function arg $\min_k\{w_k\}$. However, other criteria more appropriate to the context can be used. For instance, in applications such as background modeling, it is desirable to keep the Gaussians more likely to represent the background process around. Therefore, the function arg $\min_k\{w_k/\sigma_k\}$ is sometimes used.

Few logical choices are available for the reassignment in Step (4), which also serves as an initialization step at time t=1. The selected Gaussian is usually set to center on x with a large initial variance. Similarly, the weight for the reassigned Gaussian is set to a small value, and the weights are renormalized.

As a basis for comparison, a procedure is implemented using a winner-take-all matching criteria and a causal low-pass filter updating rule. The algorithm, which will be referred to as Low-Pass WTA, is summarized below by the pseudo code based loosely on the C programming language syntax:

Low-Pass WTA Algorithm

```
While get data x(t)
    For (k=0; k<K; k++)    // For each Gaussian Gk
    {
```

-continued

Low-Pass WTA Algorithm $$M_k = \begin{cases} 1 & \text{if } \frac{|x - \mu_k|}{\sigma_k} < T_\sigma \text{ and } k == \arg\max_i \{g_{i,t}(x) \cdot w_i\} \\ 0 & \text{otherwise} \end{cases}$$

```
w_k(t) = (1 - α) · w_k(t - 1) + α · (M_k - w_k(t - 1))
if (M_k==1)                          // Gk matches x
    MatchFound = TRUE
```

$$\eta = \alpha$$
$$\varepsilon = \eta \cdot g_{k,t}(x)$$
$$\mu_k(t) = (1 - \varepsilon) \cdot \mu_k(t-1) + \varepsilon \cdot x(t)$$
$$\sigma_k^2(t) = (1 - \varepsilon) \cdot \sigma_k^2(t-1) + \varepsilon \cdot (x(t) - \mu_k(t))^2$$

```
}
if (MatchFound == FALSE) // no Gk matches
    {
        b = arg min_i {w_i}
```
$$\mu_b = x$$
$$\sigma_b^2 = V_0$$
$$w_b = W_0$$
```
    }
normalize w
```

B. Adaptive Learning Schedule

The causal low-pass filter learning is adequate for adapting to slow changes, but its convergence in the initial stage of parameter learning is unnecessarily slow. Consider the situation where a single Gaussian is assigned to learn a sequence of identical points. The low-pass WTA algorithm initializes the mean to x and the variance to $V_0$. On subsequent iterations, since $x(t)-\mu(t)=0$, $\sigma^2(t)$ would converge to 0 at a rate of $(1-\alpha)^t$. For a typical $\alpha$ value of 0.01, it takes approximately 460 iterations to reach 1% of $V_0$. It takes ten times as long for $\alpha=0.001$. Although faster convergence can be achieved with a larger $\alpha$, doing so would result in an unstable algorithm. With a low retention factor, the model will chase wildly after each new data point.

The learning rate for initial parameter estimation plays a different role from the retention factor controlling the adaptability of the model and, therefore, requires a different schedule that is adjusted through time. The former has a goal of fast convergence on new data upon drastic changes in the distribution while the latter aims to adapt to slow migration in current data distribution and maintain model stability. The problem of selecting an appropriate learning rate schedule for online parameter estimation has been addressed in the literature. A detailed discussion on the necessary conditions for an effective learning schedule for stationary distribution can be found in Sato, M-A and Ishii, S., *Online EM algorithm for the Normalized Gaussian Network*, Neural Computation, v.12, pp. 407–432, 1999. It has been shown that with a 1/t schedule, the online EM algorithm can be considered a stochastic approximation to the batch EM algorithm and will converge to a local maximum of the likelihood function.

However, the data of interest can be characterized as being a quasi-stationary signal whose statistics may change over time. It was discovered that a modified version of the 1/t schedule could be used with unexpectedly beneficial results, namely:

$$\eta(t) = \frac{1-\alpha}{t+1} + \alpha,$$

where $\eta(t)$ represents the learning rate as a function of time, t, and $\alpha$ is a learning factor (also "temporal factor" or "temporal retention factor").

In the initial stage of learning, $\eta(t) \approx 1/t$, and $\sigma^2$ approximates a true running average of variance. As t grows past $1/\alpha$, $\eta(t) \approx \alpha$, and the algorithm assumes the regular adaptive filter learning. Using the same example as above, it takes only 56 iterations for $\sigma^2$ to reach 1% of $V_0$ when $\alpha$ is 0.01. In general, a 1/t-type of learning schedule in accordance with the invention can be characterized as having a learning rate which initially is greater than the learning factor $\alpha$ and which converges to $\alpha$ over time. Thus, at some initial time early in the learning stage, the value of the learning rate exceeds the value of the learning factor. As additional data is received with the passage of time, the learning rate is adapted and converges toward the value of the learning factor. It can be appreciated therefore, that the present invention includes any learning schedule that exhibits this unique time-adaptive behavior.

FIG. 1 shows a comparison of the convergence rate for these two learning schedules. The plot shows the value of $\sigma^2$, initialized to 1 at time 0, as a function of time. The learning curves 102a and 102b, represent learning using a conventional fixed learning rate, where $\alpha$ is 0.001 and 0.01 respectively. The learning curves 104a and 104b are produced with an adaptive learning schedule in accordance with the invention. It is clear that $\sigma^2$ converges to 0 much faster in the learning curves 104a and 104b, and relatively independent of the value of $\alpha$ when using an adaptive learning schedule.

In the context of a Gaussian mixture learning algorithm, t is defined with respect to the number of data points available to each Gaussian and needs to be reinitialized after each reassignment. In the implementation, an extra counter $c_k$ is maintained for each Gaussian which is incremented each time the Gaussian (not including the weight) is updated with respect to a data point. The counter is reset to 0 when the Gaussian is reassigned.

A particular algorithm according to the teachings of the present invention, utilizing a time-adaptive learning rate for each Gaussian, is shown below. It can be appreciated that the adaptive learning rate can be used independently of the criterion used for deciding which Gaussians should be updated. The selection criteria shown below is based on the normalized distance to the mean. However, it is recognized that other selection criteria based on the probability $g_k(x)$, the weighted probability $P_k = w_k \cdot g_k(x)$, or normalized $P_k$, are also possible.

```
while get data x(t)
    for (k=0; k<K; k++)                 // for each Gaussian Gk
    {
```

$$P_k = \begin{cases} w_i \cdot g_{i,t}(x) & \text{if } \frac{|x - \mu_k|}{\sigma_k} < T_\sigma \\ 0 & \text{otherwise} \end{cases}$$

$$R_k = \frac{P_k}{\sum_{i=1}^{K} P_i} \qquad \text{// calculate responsibility of Gk}$$

```
        if (winner-take-all)            // apply optional winner-take-all
```

$$R_k = \begin{cases} 1 & \text{if } k = \arg\max_i \{P_i\} \\ 0 & \text{otherwise} \end{cases}$$

$w_k(t) = (1 - \alpha) \cdot w_k(t-1) + \alpha \cdot (R_k - w_k(t-1))$
if ($R_k > 0$)  // Gk matches x? Can be based on Pk, Rk
    MatchFound = TRUE $c_k = c_k + R_k$ $\eta_k = \frac{1 - \alpha}{c_k + 1} + \alpha$ $\varepsilon_k = \eta_k \cdot R_k$ $\mu_k(t) = (1 - \varepsilon_k) \cdot \mu_k(t-1) + \varepsilon_k \cdot x(t)$ $\sigma_k^2(t) = (1 - \varepsilon_k) \cdot \sigma_k^2(t-1) + \varepsilon_k \cdot (x(t) - \mu_k(t))^2$

```
    }
    if (MatchFound==FALSE)              // no Gk matches
        k = arg min_i{w_i}              // pick a Gk for reassignment
        w_k = W_0                       // destroy old Gk
        μ_k = x                         // reassign it to x
        σ_k² = V_0                      // large initial variance
        c_k = 1                         // reset learning for Gk
```

The foregoing allows for more than one Gaussian to be updated. Alternatively, a winner-take-all approach can be used in which only one Gaussian is selected for update.

```
while get data x(t)
    for (k=0; k<K; k++)                 // for each Gaussian Gk
    {
```

$$M_k = \begin{cases} 1 & \text{if } \frac{|x - \mu_k|}{\sigma_k} < T_\sigma \text{ and } k == \arg\max_i \{g_{i,t}(x) \cdot w_i\} \\ 0 & \text{otherwise} \end{cases}$$

$w_k(t) = (1 - \alpha) \cdot w_k(t-1) + \alpha \cdot (M_k - w_k(t-1))$
if ($M_k == 1$)
    MatchFound = TRUE $c_k = c_k + 1$ $\eta_k = \frac{1 - \alpha}{c_k + 1} + \alpha$ $\varepsilon_k = \eta_k$ $\mu_k(t) = (1 - \varepsilon_k) \cdot \mu_k(t-1) + \varepsilon_k \cdot x(t)$ $\sigma_k^2(t) = (1 - \varepsilon_k) \cdot \sigma_k^2(t-1) + \varepsilon_k \cdot (x(t) - \mu_k(t))^2$

```
    }
    if (MatchFound==FALSE)              // no Gk matches
        k = arg min_i{w_i}              // pick a Gk for a reassignment
        w_k = W_0                       // destroy old Gk
        μ_k = x                         // reassign it to x
        σ_k² = V_0                      // large initial varciance
        c_k = 1                         // reset learning to Gk
```

C. Weight Updating

The estimation of the weights is important to mixture model learning because it represents an estimation of the unobserved variable. In batch EM learning, the weights are estimated as $w_k = \Sigma_x P(x) P(G_k|x)$ at the end of each iteration. In an online algorithm, weight updates are usually followed by a normalization to ensure they sum to 1. In accordance with another aspect of the present invention, the normalization procedure is believed to be unnecessary and deemed to cause disruption in parameter learning during initialization or after reassignment. When a Gaussian gets reassigned, its weight is initialized to a small value $W_0$ to reflect the deviation of this Gaussian from data observed in the past and a low confidence in its ability in explaining new data that is forthcoming. However, through normalization, the weight previously associated with that Gaussian prior to reassignment is automatically redistributed among all Gaussians. In this section, an examination is made of the weight updating mechanism and a justification for not normalizing the weights is proposed. An appropriate value of $W_0$ will be derived.

First, consider the basic weight updating scheme where there is a mixture of K Gaussians whose weights always sum to 1. At iteration t, the weights are updated against a new data point. Suppose one Gaussian matched x. In that case, all the weights are updated using:

$$w_k(t) = (1-\alpha) \cdot w_k(t-1) + \alpha \cdot M_k$$

Consequently, the weight of the matching Gaussian, $G_+$, will be increased by:

$$\Delta W^*(t) = -\alpha \cdot w_+(t-1) + \alpha = \alpha \cdot (1 - w_+(t-1)),$$

and weights of the other Gaussians will be decreased by a total amount of:

$$\Delta W^-(t) = \sum_{k \subset M_k==0} -\alpha \cdot w_k(t-1) = -\alpha \cdot (1 - w_+(t-1)).$$

The weight of the matching Gaussian moves toward 1, while the weights of non-matching Gaussians move toward 0, and the amount of positive and negative gains cancel each other. If the weights sum to 1 before the update, they will sum to 1 after the update. The weights are merely redistributed, and normalization is not necessary.

Things work differently, however, when no Gaussian matches x. Suppose G* is selected for reassignment, then the total weight change before normalization is:

$$\Delta W(t) = W_0 - w^*(t-1).$$

After normalization, the weight changes are $$\Delta w_*(t) = \frac{\Delta W(t) \cdot (1 - w_*(t-1))}{1 + \Delta W(t)}$$

$$\text{and } \Delta w_i(t) = w_i(t-1) \cdot \frac{-\Delta W(t)}{1 + \Delta W(t)} \forall i \neq *$$

$$\Delta w_{i \neq *}(t) = \sum_{i \neq *} \Delta w_i(t) = \frac{\Delta W(t) \cdot (w*(t-1) - 1)}{1 + \Delta W(t)}.$$

The results are not so easy to interpret, but one can consider several cases. If G* previously had a weight greater than $W_0$, in other words, $\Delta W(t) < 0$, then $w^*$ will get a negative weight change, while weights for all other Gaussians are increased. On the contrary, if $\Delta W(t) > 0$, then $w^*$ ends up with a positive net gain equaling the total amount deducted from all other Gaussians. Weights for persisting Gaussians are changed for no good reason other than to preserve the property that priors must sum to 1.

A new weight updating scheme is proposed which is consistent across all cases. Consider adding a $(K+1)^{th}$ Gaussian to the original K-Gaussian mixture. This Gaussian, whose variance is fixed at infinity, represents a best guess for all data unseen or unexplained by the first K Gaussians. Its weight, $w_{K+1}$, is the percentage of data unknown or unexplained by the first K Gaussians. If the same weight updating rule as above is applied, with this last Gaussian matching all data points not matched by any of the first K Gaussians, then the updating equation above always applies and always results in a redistribution of weights between the first K Gaussians and the unknown pool. When there is a match $G_+$ in the first K Gaussians, an amount deducted from non-matching Gaussians are first added to the unknown pool and then transferred to $G_+$. When there is no match in the first K Gaussians, a total of $\alpha \cdot (1 - w_{K+1}(t-1))$ is first deducted and added to $w_{K+1}$. When G* is selected for reassignment, $w^{*'}(t-1)$ is added to $w_{K+1}$.

Finally $W_0$ is withdrawn from the pool and assigned to G*. What should be the value of $W_0$? At initialization, all data are unknown and thus $w_{K+1} = 1$ and $w_i = 0$ for the first K Gaussians. At first match, $w_+$ will be increased by:

$$\alpha \cdot (1 - w_+(t-1)) = \alpha \cdot (1-0) = \alpha.$$

After destroying G*, its reassignment works no differently from initialization. Therefore, $W_0 = \alpha$.

Note that one starts out with the most basic assumption about unseen data: a uniform distribution. (Of course, if such knowledge about the priors is available, one can incorporate it.) Each time a Gaussian successfully explains a point, a small weight is shifted from the unknown pool to that Gaussian. Conversely, each time it fails to explain a point, a small amount is shifted to the unknown pool. The implementation of this new scheme with the (K+1)th Gaussian requires no additional storage. It is equivalent to a K Gaussian mixture without weight normalization. The approach simply makes use of the one degree of freedom that was lost when weights are normalized.

D. Experimental Results

First, several versions (winner-take-all or full update, with or without weight normalization, adaptive or fixed learning schedule, etc) of the online algorithm were evaluated on several synthetically generated mixture distributions. Since similar characteristics are also seen in tests on real data, a summary of the results on synthetic data only will be presented, followed by a discussion of the real data experiment. The improvement made with an adaptive learning schedule is dramatic. It consistently improved overall data modeling accuracy in almost every variation that was tested and showed no obvious side effects. The proposed weight updating scheme (no normalization) showed definite advantages over a normalized version in places where sudden distribution changes occurred. However, those differences disappeared quickly when the adaptive learning schedule is used in combination. Winner-take-all and full-update perform similarly in most cases. However, as the overlap among Gaussians in the mixture increases, a full-update algorithm displayed much better consistency over a winner-take-all version.

Based on the evaluation on synthetic data, let us compare a winner-take-all version of the proposed algorithm (with adaptive learning schedule and no weight normalization) against a winner-take-all version of the basic adaptive filter learning algorithm with fixed learning rate and weight normalization on real data. Below is the pseudo-code of the proposed algorithm with both changes incorporated.

WTA Version of Proposed Algorithm

```
while get data x(t)
для (k=0; k<K; k++)        // for each Gaussian Gk
{
```
$$M_k = \begin{cases} 1 & \text{if } \frac{|x - \mu_k|}{\sigma_k} < T_\sigma \text{ and } k == \arg\max_i \{g_{i,t}(x) \cdot w_i\} \\ 0 & \text{otherwise} \end{cases}$$

$w_k(t) = (1 - \alpha) \cdot w_k(t - 1) + \alpha \cdot (M_k - w_k(t - 1))$
if ($M_k$==1)
    MatchFound = TRUE $c_k = c_k + 1$ $\eta_k = \frac{1 - \alpha}{c_k + 1} + \alpha$ $\varepsilon_k = \eta_k$ $\mu_k(t) = (1 - \varepsilon_k) \cdot \mu_k(t - 1) + \varepsilon_k \cdot x(t)$ $\sigma_k^2(t) = (1 - \varepsilon_k) \cdot \sigma_k^2(t - 1) + \varepsilon_k \cdot (x(t) - \mu_k(t))^2$ }
if (MatchFound==FALSE)      // no Gk matches
    k = arg min$_i\{w_i\}$     // pick a Gk for a reassignment
    $w_k = \alpha$               // destroy old Gk
    $\mu_k = x$                  // reassign it to x
    $\sigma_k^2 = V_0$           // large initial varciance
    $c_k = 1$                    // reset learning to Gk Sets of video data were collected representing (r,g,b) pixel values from a fixed location inside a meeting video. The first set corresponds to an unobstructed point on the wall, therefore, the pixel value is very stable over time. The second set corresponds to a different point on the wall which occasionally is occluded by a person's face or shirt. Therefore, the pixel values show very drastic changes in several places (in time). Both algorithms were tested using $\alpha$=0.01 and $T_\sigma^2$=10.

Results on the first set (Wall data) are shown in FIG. 2. For simplicity, only the red component of the actual pixel values (y-axis) plotted against time (x-axis) is shown. FIG. 2(A) shows how the mean 212a of one Gaussian matches against the actual pixel values 202 using the basic algorithm. The shaded area 214a shows the extent of 3 standard deviations for that Gaussian, illustrating the variation of the of the standard deviation over time. It is clear from the figure that the standard deviation is converging very slowly even with such clean data. The same data plotted in FIG. 2(B) shows the result using the method of the present invention. As can be seen, the standard deviation converged very quickly to fit the actual data. This is visually indicated by the much smaller shaded region 214b representing the extended 3 standard deviation of the Gaussian over time.

Results of a comparison of the prior art method and the algorithm of the present invention on the second data set (Person) are shown in FIGS. 3 (prior art) and 4 (invention), respectively. Since the data in this set is much more dynamic than the video signal from a spot on the wall, different parts of the data are learned by different Gaussians.

In these experiments, three Gaussians were used to model the data. To illustrate this fact, the same plot of the video data for the red pixel component is shown for each of the 3 Gaussians. The weight 224 associated with each Gaussian is shown at the bottom of each plot. The first 3 plots shown in FIG. 3 correspond to the basic algorithm. While one of the Gaussians successfully learns the value of the wall color, it is not able to converge on new data when the wall is occluded, leaving the remaining two Gaussians useless. On the contrary, as can be seen in FIG. 4, the data model based on the proposed algorithm is able to fit all data quite well. When the wall is occluded, a new Gaussian picks up the new cluster center and starts gaining weight.

The same comparison was performed on several sets of real and synthetic data and a consistent advantage of the method of the invention was observed. When the algorithm was used in a video background segmentation system, it allowed us to achieve faster and more accurate learning of the background model, which lead to better overall segmentation results. Details of the experiments are described in an accompanying paper attached hereto as Appendix A.

APPENDIX A

A Bayesian Framework for Background Segmentation Based on Adaptive Gaussian Mixtures Dar-Shyang Lee
Ricoh Innovations, Inc.
2882 Sand Hill Road, Suite 115
Menlo Park, CA 94025, USA
dsl@rii.ricoh.com

ABSTRACT

Background segmentation is an essential component of any video analysis system with a wide range of applications. Recent research has proposed using adaptive Gaussian mixtures for background modeling in real-time video surveillance applications. However, ad hoc decision rules have been used and no theoretical framework has been proposed for this approach. In this paper, we describe a framework for background segmentation based on Gaussian mixture modeling. We show that the segmentation problem can be decomposed into two density estimation problems, and a set of intuitive and theoretically sound solutions can be derived for several related tasks. We also propose a novel algorithm for learning adaptive Gaussian mixtures that improves convergence dramatically. Experimental results show the proposed algorithm achieves significantly better performance than existing algorithms.

Keywords: background segmentation, Gaussian mixtures, panoramic meeting videos

1. INTRODUCTION

Background segmentation is an essential preprocessing step of many multimedia systems with applications ranging from content-based retrieval to object-based coding. Over the years, research has progressed to replace static background models suitable only for experimental settings with increasingly more complex adaptive models such as Gaussian mixtures to handle real world conditions. Several successful applications based on a Gaussian mixture background model have been reported [2,3,8]. However, there lacks a good discussion on a theoretical framework these methods are based on. In this paper, we propose a framework for the background segmentation problem based on Gaussian mixtures and show how domain-specific priors and spatial constraints can be applied under the framework. We further derive optimal solutions, in the Bayesian sense, for a set of related questions. We tested the algorithm on panoramic meeting videos and obtained good performances.

The choice of Gaussian mixtures for background modeling is called for by our application. We have developed a meeting recording system [6] which captures 360-degree panoramic videos of meetings as shown in Figure 1. In this context, the goal of background segmentation is to identify regions containing humans in meeting videos as foreground. The actual contour extraction and tracking of multiple people will have to rely on adequate object modeling, which is not in the scope of this paper. Background segmentation in these videos poses several challenges. First of all, motion characteristics can vary greatly among objects or within an object, and they change over time. In addition, people can be relatively stationary for a long time while sitting down, moving their heads and hands only occasionally. Secondly, the background environment can change drastically. Office equipment such as slide projectors may be moved. Electronic whiteboards can be turned on and off. Doors may be open and shut. Even lighting conditions may change when the sun shines through windows. Furthermore, the camera placed on the conference table may be moved between meetings, making it infeasible to rely on a static initialization of an empty room. Given the multimodal nature of these distributions, we expect an adaptive Gaussian mixture model is the most appropriate. It is better at handling temporary occlusion than the commonly used single Gaussian model [4,9]. Its analytical form also makes the solution more efficient and the problem more tractable than a non-parametric approach [1].

Previous works on using Gaussian mixtures for adaptive background modeling shared a similar strategy. At each pixel location in the video, a Gaussian mixture is trained on all the values observed at that point through time using adaptive filtering $$M(t) = \alpha \cdot M(t-1) + (1-\alpha) \cdot \Delta(x(t)) \qquad (1)$$

where $M(t-1)$ is the original model estimation at time $t-1$, $\Delta(x(t))$ is the new parameter estimation based on the data at time $t$, and $\alpha$ is the temporal retention factor. Since

Figure 1 – A touch-screen controlled meeting recorder system and the panoramic video it captures.

values appearing more often and have less variation are more likely to be background, Gaussians in the model are sorted in decreasing $w/\sigma$. Based on the assumption that background is observed more frequently than a threshold in the time window, the first $b$ Gaussians in the ordered list are classified as background, where $b$ is determined based on a threshold on time coverage. After each data observation, the list is reordered. While this algorithm has been successfully employed in surveillance applications where background changes occur gradually over a long period of time and mainly moving objects are of interests, we have difficulty adapting it to meeting videos where background changes occur more frequently and people's movements are limited. Furthermore, without a theoretical foundation, it is unclear how the model can be extended to include domain context such as skin color and location priors.

The framework we propose for background segmentation decomposes the problem into two independent density estimation problems. The first problem is to model the distribution of values observed at each pixel location with a Gaussian mixture, which is a well-studied problem with clear objectives [7]. We employ an online EM algorithm with an adaptive learning schedule to speed up convergence. With an explicit expression of the underlying pixel distribution, the original background segmentation problem can be formulated as classification of the Gaussian constituents. This classification depends on the posterior probability of a Gaussian being background. Inevitably, this second problem will depend largely on problem-specific heuristics. However, this separation provides a guideline on how domain knowledge and spatial constraints should be incorporated. In the interests of finding people in the video, we apply priors for skin colored Gaussians. Models at neighboring pixels are also consulted to help propagate high confidence decisions such as "the wall is yellow."

There is an intuitive interpretation for solutions under this framework. Assuming the observations at each pixel location result from a number of discrete processes, we first color quantize them to reveal the underlying processes. Then the observation is classified as foreground or background based on the classification of the process to which it belongs. Based on this formulation, we obtain unequivocal optimal solutions, from a statistical pattern recognition point of view, for several related problems. For example, a pixel observed at a given time is classified as foreground if its probability of being foreground, expressed in terms of a mixture distribution and posteriors of the Gaussians, is greater than 0.5. Consequently, the background model is subset of the overall mixture distribution containing only points belonging to the background process. Furthermore, a representation of a background model is the expected value of the pixel given it is background. This work can be considered as a generalization of earlier works [2,3,8] where the posteriors of the Gaussians are binarized. However, as we demonstrate in the experiments, this generalization has great impacts on the segmentation performance and can be easily extended to incorporate domain knowledge.

The rest of the paper is organized as follows. In Section 2, we describe the overall framework for background segmentation. Details of each process, treated as a density estimation problem, are then provided in subsections. Based on this framework, we also derive solutions for a set of related problems. In Section 3 we discuss implementation details and show experimental results. Finally, we draw conclusions in Section 4.

2. BAYESIAN FRAMEWORK

In this section, we introduce a framework for the foreground extraction problem. It is well recognized that video background segmentation is a binary classification problem: decide each pixel in the frame at time $t$ as *foreground* or *background*. Without giving a precise definition of *foreground* and *background*, we loosely define *foreground* to be some regions of interests as defined by some oracle. From a Bayesian perspective, this decision should be based on the posterior probability of the pixel being background $P(B|x(r,c,t))$ where $x(r,c,t)$ denote the pixel observed at location (r,c) in the frame at time $t$ and $B$ denotes the background class. Since any observation must belong to either foreground or background, $P(F|x(r,c,t)) + P(B|x(r,c,t)) = 1$. To simplify the notation, we omit the location and time subscripts where the meaning is clear. We also assume $x$ is single dimension. Extension to a higher dimension is straightforward.

Considering the multimodal nature of values observed at a pixel location over time, a Gaussian mixture is used to model the distribution, with each Gaussian representing an underlying process.

$$P(x) = \sum_{k=1}^{K} P(G_k)P(x|G_k) = \sum_{k=1}^{K} w_k \cdot g(x(t),\mu_k,\Sigma_k) \qquad (2)$$

where $G_k$ is the $k$-th Gaussian and $g_k(x) \equiv g(x,\mu_k,\Sigma_k)$ is the Gaussian density function. Assuming all observations coming from a single process belongs to either foreground or background, the original segmentation problem can be reformulated as $$P(B|x) = \sum_{k=1}^{K} P(B|G_k)P(G_k|x) = \sum_{k=1}^{K} P(B|G_k)[\frac{P(x|G_k)P(G_k)}{P(x)}]$$
$$= \frac{\sum_{k=1}^{K} P(x|G_k)P(G_k)P(B|G_k)}{\sum_{k=1}^{K} P(x|G_k)P(G_k)} \qquad (3)$$

The segmentation problem is decomposed as two independent problems: estimate the distribution of *all* observations at the pixel as a Gaussian mixture, and evaluate how likely each Gaussian in the mixture is background. The first problem is analogous to quantizing pixel colors to reveal the underlying process, and the second problem addresses classifying the process as foreground or background. To determine if an observed pixel at time $t$ foreground or background, it is obvious that decision should be background if $P(B|x) > 0.5$, and foreground otherwise. Solution to the first problem provides us with estimates of $P(G_k)$ and $P(x|G_k)$. Solution to the second problem gives us an estimate of $P(B|G_k)$. They are described in the next two sections.

2.1 Estimate P(x)

The problem of density estimation using Gaussian mixtures is well studied [7]. Considering the real-time nature of video signals, the constraint for our application is that an *online*, instead of *batch*, learning algorithm is needed and the model must adapt to distribution changes over time. The adaptive filtering algorithm typically used [1,2,3,4,8,9] employs a fixed learning rate and forces weight normalization. We propose using an adaptive learning rate schedule for each Gaussian to improve its convergence property. In addition to the normal weight, mean and variance parameters, a new parameter $c_i$ is added to count the number of data points that has directly contributed to the update of the *i*-th Gaussian. We have found that using a separate learning rate for each Gaussian based on this number instead of using a fixed learning rate for all Gaussians in the mixture dramatically improved the convergence speed and approximation results. We also avoid weight normalization to eliminate abrupt changes in the distribution model. A detailed discussion and experimental results of this algorithm can be found in [5].

The algorithm is summarized as follows. Let $w_i(t), \mu_i(t), \sigma_i^2(t)$ be the weight, mean and variance estimation of the *i*-th Gaussian at time *t*. A parameter, $\alpha$, controls temporal retention, and a threshold, $T_\sigma$, determines if a point matches a Gaussian. If $\frac{|x-\mu_k|}{\sigma_k} > T_\sigma$, then $g_k(x) = 0$. The weights and means are initialized to 0. Variances are set to a large value $V_0$. Then at time *t*, for any Gaussian $G_k$ that matches $x(t)$, its parameters are updated $$p_k(x) = \frac{w_k \cdot g_k(x)}{\sum_{i=1}^{K} w_i \cdot g_i(x)}$$

$$c_k = c_k + 1$$

$$\eta_k = p_k(x) \left( \frac{1-\alpha}{c_k + 1} + \alpha \right)$$

$$\mu_k(t) = (1 - \eta_k) \cdot \mu_k(t-1) + \eta_k \cdot x$$

$$\sigma_k^2(t) = (1 - \eta_k) \cdot \sigma_k^2(t-1) + \eta_k \cdot (x - \mu_k(t))^2$$

If no Gaussian matches $x(t)$, then one of the Gaussian is reassigned.

$$k = \arg\min_i \{w_i\}$$

$$w_k = 0 \quad \mu_k = x \quad \sigma_k^2 = V_0 \quad c_k = 1$$

At the end, all weights are updated using $$w_i(t) = (1-\alpha) \cdot w_i(t-1) + \alpha \cdot (p_i(x) - w_i(t-1))$$

The criterion for selecting a Gaussian for reassignment can be application dependent. For example, we have also tried $\arg\min_i \{P(B|G_i)\}$ to keep good background candidates around longer, but we have noticed very little difference in performance. Compared to the work of [3,8] where $\eta_k = \alpha \cdot g_k(x)$, we observed the new formulation to perform much better.

2.2 Estimate P(B|G$_k$)

Unlike the previous problem of density estimation where the objective and desired algorithm behaviors are well defined, estimating $P(B|G_k)$ is largely based on heuristics and application dependent. However, compared to the original classification task of $P(B|x)$, the problem is simplified by this decomposition because more context can be utilized for estimating $P(B|G_k)$. Separation of this component from the rest also provides a clear statistical meaning for the heuristics and allows for a theoretical analysis for the rest of the segmentation problem.

Since background is typically observed more often and displays less variation in value, $w/\sigma$ provides a good basis for the decision. In addition, domain specific priors based on the location of the pixel or the mean of the Gaussian can be incorporated. For example, given we are interested in detecting people in video, a bias is placed against Gaussians whose means are skin tone being background. Furthermore, background models at neighboring locations and global statistics over the entire image provide additional context for refining this estimate. Unfortunately, how these priors and constraints are incorporated into a single estimation of posterior probability is inevitably ad hoc.

In our implementation, we approximate $P(B|G_k)$ with $b_k^{r,c} = w_k^{r,c} \cdot (E_\sigma / \sigma_k^{r,c})$ where $E_\sigma$ is the expected value of the variance for a background Gaussian. We estimate this by averaging the variance of the top 25% of Gaussians in the entire image that have the largest $P(B|G_k)$. The maximum of this function is set at 1. Since people are less likely to appear near the top of the image (close to the ceiling) unless they are very close to the camera, a weak bias is incorporated to the vertical position. More precisely, we multiply $b_k^{r,c}$ by $$h_k^{r,c} = \begin{cases} 1.1 & \text{if } r < \text{image height}/2 \\ 1 & \text{otherwise} \end{cases}$$

To enhance the detection of human, a strong bias is placed against skin color being background. Skin tone is detected using a single Gaussian distribution in the normalized red-green color space [10]. If the mean of the Gaussian is classified as a skin color, the probability of it being background is halved.

$$s_k^{r,c} = \begin{cases} 0.5 & \text{if skin}(\mu_k) > 0.8 \\ 1 & \text{otherwise} \end{cases}$$

Finally, models at neighboring locations are incorporated. If $\mu_k^{r,c}$ at position $(r,c)$ evaluates to be background with a high probability at its neighboring positions $(r',c')$, then its estimate $b_k^{r,c}$ is also incremented. This local re-enforcement helps propagating established background models to regions where background is not well recognized. For example, a previously occluded area on the wall can be quickly recognized due to similarity to its surrounding colors. Currently, a neighborhood consisting of the top, left and right pixels is used, and for each neighbor where $P_{r',c'}(B|\mu_k^{r,c}) > 0.8$ as computed by Eq.(2) and (3), $b_k^{r,c}$ is incremented using $b_k^{r,c} += 0.1 \cdot (1 - b_k^{r,c})$.

It should be pointed out that $P(B|G_k)$ is considered independently for each Gaussian and, therefore, does not sum up to one. This discussion eventually depends on the precise definition of *background*. Nevertheless, this is the most general case and can be constrained to suit different applications. For instance, in most surveillance applications more interests are placed on moving objects. Any object can become background after dormant for a while. Under that definition, it is reasonable to assume a certain amount of observation during any time window belongs to background. This is the strategy used in [1,3,8] where the background process is estimated by selecting a minimum number of Gaussians to provide at least $T$ percent coverage of the observations. Obviously, the same heuristic can be in our framework. On the other hand, in certain applications such as meeting video analysis, the true background for some location of the video can be constantly occluded and never revealed. This conclusion may come about from other evidence such as where the speaker is expected to be or a reliable object model which has identified the presence of a person in that location. In those situations, it may be desirable to indicate the fact that the "background" is never seen rather than calling the person background. Of course, how the true background can be estimated in that case is a different issue.

2.3 Background Model

The algorithms described in the previous two sections provide all the necessary elements for performing background segmentation. Nevertheless, it is useful to derive solutions for a set of related problems under the assumption that estimates for those density functions are available. The first question is what is the background model at given time $t$. If we can separate all observations into their respective classes, the background model consists of the portion of the observations which are believed to be background, which is the second term in the equation $$P(x) = \sum_{k=1}^{K} P(x|G_k)P(G_k)P(F|G_k) + \sum_{k=1}^{K} P(x|G_k)P(G_k)P(B|G_k)$$

Therefore, the background model $M(r,c,t)$ is represented by the same Gaussian mixture with the constituent Gaussians weighted by our estimate of $P(B|G_k)$. Assuming $P(x|G_k,F) = P(x|G_k,B) = P(x|G_k)$, then the background process at location (r,c) is modeled as $$M(r,c,t) = \sum_{k=1}^{K} P(x|G_k)P(G_k)P(B|G_k) = P(x|B) \quad (4)$$

The solution defined by Eq.(4) is very intuitive: the background model is composed of the set of observations which are generated by the background process. This subset is selected from the entire set of observations based on our belief whether the constituent Gaussian is background or not. Since we are representing $P(x)$ using a Gaussian mixture, our background model is also represented as a Gaussian mixture.

This definition of the model is a generalization of the labeling rule used in earlier works where the best $b$ Gaussians is labeled background. This is equivalent to a dichotomous decision with $P(B|G_k)$ equaling either 1 or 0. However, a binary decision causes abrupt changes when the Gaussian label switch from foreground to background or vice versa. Those discontinuities are eliminated in the generalized formulation.

Although the background model is precisely defined as a Gaussian mixture in Eq.(4), it is often useful to obtain an image representation of the background model for the purpose of visualization or analysis. A straightforward solution is to use the mean of the Gaussian most likely to be background. The drawback for this method is that the image will stay constant until a change suddenly occurs when a different Gaussian becomes the best. Under the Bayesian framework, the most representative image of the background is the expected value of $P(x|B)$ at all locations. Therefore, $$E[M(r,c,t)] = E[x_{r,c}|B] = \sum_{k=1}^{K} E[x] \cdot P(x|G_k)P(G_k|B)$$

$$= \frac{\sum_{k=1}^{K} \mu_k(t) \cdot P(B|G_k)P(G_k)}{\sum_{k=1}^{K} P(B|G_k)P(G_k)} \quad (5)$$

Again, we obtain a very intuitive solution. The image is calculated as a linear average of the Gaussian means, weighted proportionally by their weights and posterior probabilities of being background. Unlike the definition of the background model, which ultimately determines what is considered foreground, the representation of the background model does not have any direct impact on the segmentation results. This issue of obtaining a meaningful representation of the background has not been mentioned in previous Gaussian mixture background modeling works.

2.4. Model Confidence

Considering that at each time $t$ we have a precise background model provided by Eq.(4) and a meaningful representation of it provided by Eq.(5), it is natural to ask which is the *best* background model over a time period. This is important in selecting a reference for object-based coding or in detecting background changes. The answer to this question obviously depends on how we classify the process as foreground or background. It also depends on our definition of what is *best*. However, a couple criteria may be considered at this point.

One possible criterion is to select the model that reveals the most background. Since the background may not be visible in all regions of the video at all times, it is reasonable to select the model that provides the maximum exposure of the background. This can be calculated using $$f_B(r,c,t) = P(B) = \sum_{k=1}^{K} P(B|G_k)P(G_k). \quad (6)$$

From another perspective, just because a background process is revealed more often does not necessarily imply we have a better estimate. For example, we can easily pick out the wall as background even on a short glimpse because we know the color of the wall from the rest of the image. In contrast, the algorithm may have difficult detecting a flickering monitor as background even if it is never occluded. In this view, it makes sense to use the maximum posterior estimate we have about the processes $$f_R(r,c,t) = \max_k \{P(B|G_k)\}. \quad (7)$$

The question remains whether to select the model with the maximum total exposure at a single frame t or to independently select the highest exposure model for each pixel. Although each pixel model evolves independently of the others, the former provides a better spatial consistency since the image is selected from a single time $t$. In contrast, the latter is able to explore any non-redundancy over time to generate a bigger or more accurate estimate than possible at any single moment. This issue is still under investigation.

3. EXPERIMENTS

The proposed algorithm was tested on real meetings recorded in our lab. The recording system [6] produces 640x480 MPEG2 omni-directional videos at 30fps. The omni-directional video is dewarped into a full panoramic video for background segmentation, which is implemented in VC++ as a DirectShow transform filter. On a 1000x150 panoramic input video, the entire decode, dewarp and segmentation process runs at 2Hz on a 2GHz Pentium4 PC. In our experiments, we used 3-Gaussian mixtures and $\alpha=0.999$, values typically reported in literature. We have tried RGB and YUV color space, and assumed a diagonal covariance matrix.

We first compared the proposed learning algorithm to the fixed-rate adaptive filter algorithm for Gaussian mixture density estimation in Figure 2. The "red" color component of a pixel observed over 4000 frames in a video is plotted as green '+' in the graphs. The most dominant cluster, which represents the wall, is seen near the top. In several occasions, the background is occluded by two foreground objects. One is a tight cluster near the value 70, and the other is distributed in the range between 100 and 200. The means for the 3 Gaussians are plotted over time as lines. The variance of the Gaussian corresponding to the background is indicated by the red region. Variances for the other two Gaussians are not shown to reduce clutter. Figure 2(a) shows the results of fixed rate learning. While the mean accurately followed the background cluster, the variance decreased very slowly. The slow convergence leads to erroneous grouping of some of the foreground cluster. Consequently, the second Gaussian picked up all the remaining points, and the third Gaussian remained at 0 and was not utilized. In contrast, both the mean and variance converged quickly to the background cluster using the adaptive learning schedule, as shown in Figure 2(b). The second Gaussian picked up the foreground object as soon as it appeared. Although this Gaussian

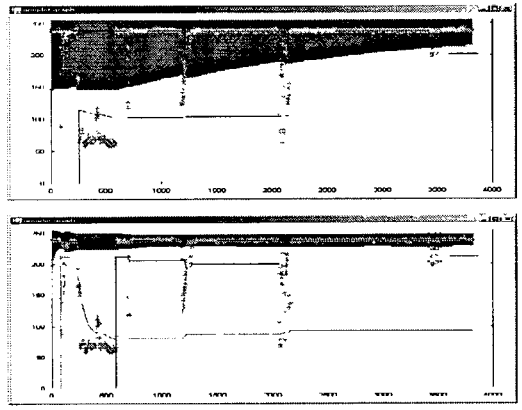

Figure 2- Results of Gaussian mixture learning using (top) fixed-rate and (bottom) adaptive schedule on the color component of a pixel in a video. Pixel values are plotted as green "+"; means for the 3 Gaussians are plotted as lines, and the variance for the Gaussian corresponding to the true background is indicated by the red region. Convergence is slow in (a) and only two clusters are detected (the third remained at 0 mean). (b) achieves faster convergence and better estimation.

mistakenly adapted and included the other foreground object around frame 500, its variance shrank fast enough to correctly assign a new Gaussian to the other object around frame 600. It should be pointed out that this convergence issue comes into play every time there is significant change in the distribution and not just during initialization. We performed similar tests on several data sets and have observed consistently better performance using the proposed learning algorithm [5].

Then we test the proposed background segmentation algorithm against the method reported in [8]. To summarize, that method uses a fixed-rate learning to estimate Gaussian mixtures. The Gaussians are sorted by $w/\sigma$, and the best $b$ Gaussians covering $T$ percent of observations are labeled as background. We used $T=0.01$ hence only the single best Gaussian is selected as background. A given pixel is classified as foreground or background depending on the label of its best matching Gaussian. Results of the segmentation for frame 700, 1000 and 1500 of a video are shown in Figure 4. The original video for the corresponding frames are shown in Figure 3. Means of the background Gaussian at every pixel are used to generate the background image.

Several observations can be made from Figure 4. First of all, it is clear that adaptation is slow, as we expected. Even after 1500 frames, the background model still showed remnants from frame 1 of the video. Consequently, the center region where the person was in frame 1 was still classified as foreground at frame 1000, and the area where the mug had been was falsely detected as foreground at frame 1500. Secondly, the binary classification of Gaussians as foreground or background produces discontiguous regions in the background representation. This effect was most noticeable around the person's face. The same disruption also occurs in the temporal domain. Although this effect is not directly observable from the figure, it can be analyzed that the background model would remain constant for a while and suddenly change when the ranking of the Gaussians changed.

The results of the proposed method, which incorporates the fast mixture learning algorithm and the generalized Gaussian classification, are shown in Figure 5. The improvement was significant. By frame 700, only a small trace of the person from frame 1 was found in the background model. Consequently, the person was segmented correctly and no ghost foreground was found near the center where the person was in frame 1. In frame 1000, the person was segmented almost perfectly. The false detection near the mug was inevitable because it has just been removed. However, by frame 1500, the model has learned the background change, and segmented the foreground correctly. The model representation was generated using Eq.(4) and (5). The background model showed more spatial consistency compared to those shown in Figure 4. The shape of the person observed in frame 1 was gradually blended into the background over time. From the perspective of object detection, it is more difficult to distinguish a sudden appearance or disappearance of a falsely classified region from real objects.

4. CONCLUSIONS

In this paper we described a Bayesian framework for video background segmentation based on Gaussian mixture modeling. The original classification problem is treated as a density estimation problem using Gaussian mixtures followed by a classification of the constituent Gaussians. Based on this formulation, we derived a set of intuitive and theoretically sound solutions for several related problems. The generalized framework provides both theoretical and performance advantages over previous works. We also described an improved algorithm for learning the mixture background model using adaptive learning rate and showed significant improvement over existing methods.

Several open questions need to be further investigated. Although the framework provides a clear objective that we wish to approximate the posterior probability of the Gaussians being background, the actual implementation and integration of the various constraints and heuristics are still ad doc in nature. A more systematic approach based on machine learning needs to be developed. Moreover, a more rigorous definition of the certainty of the background model needs to be developed. Having a more precise definition of the background model, we can detect significant changes in the scene background, for example when someone closes the conference room door, as a video retrieval cue. Finally, applications of background segmentation for location recognition and MPEG4 object-based encoding are being investigated.

5. REFERENCES

[1] A. Elgammal, D. Harwood and L. Davis, "Non-parametric model for background substraction," *Proc. 6th European Conference on Computer Visi on*, 2000.

[2] N. Friedman, S. Russel, "Image segmentation in video sequences: a probabilistic approach," *Proc. 13th Conf. Uncertainty in Artificial Intelligence*, August. 1997.

[3] M. Harville, G. Gordon and J. Woodfill, "Foreground segmentation using adaptive mixture models in color and depth," *ICCV Workshop on Detection and Recognition of Events in Video*, pp.3-11, 2001.

[4] S. Khan and M. Shah, "Tracking People in Presence of Occlusion," *Proceedings of ACCV*, 2000.

[5] D.S. Lee, "Adaptive Mixture Learning in Dynamic Systems," CRC Technical Report, March, 2002.

[6] D.S. Lee, B. Erol, J. Graham, J. Hull and N. Murata, "Portable Meeting Recorder," submitted to *ACM Multimedia 2002*.

[7] G. McLachlan and D. Peel, *Finite Mixture Models*, Wiley, New York, 2000.

[8] C. Stauffer and W.E.L. Grimson, "Adaptive background mixture models for real-time tracking," *Proc. CVPR*, v.2, pp.246-252, June 1999.

[9] J. Yang, X. Zhu, R. Gross, J. Kominek, Y. Pan, A. Waibel, "Multimodal People ID for a Multimedia Meeting Browser," *Proceedings of ACM Multimedia*, pp.159-168, 1999.

[10] J. Yang and A. Waibel, "A Real-Time Face Tracker," *Proceedings of WACV*, pp.142-147, 1996.

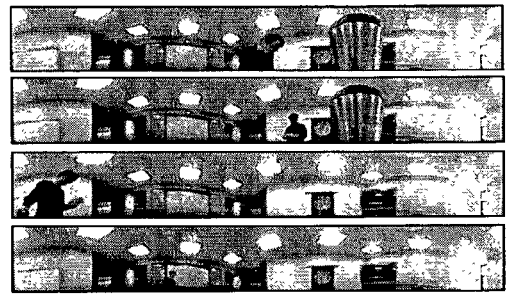

Figure 3 – From top to bottom, frame 1, 700, 1000 and 1500 of the video used in our experiment.

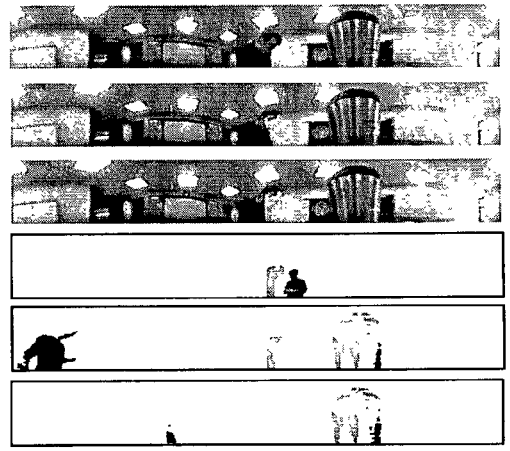

Figure 4 – Segmentation results of frames in Fig.2 using the algorithm reported in Stauffer & Grimson. The background model constructed for frame 700,1000, and 1500 are shown in (a), and the segmented foreground are shown in (b).

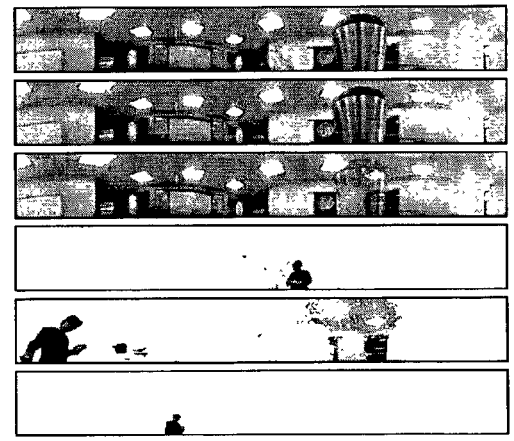

Figure 5 – Segmentation results using the proposed algorithm. The algorithm was able to learn an accurate background model after 700 frames and segment out the person. In frame 1000, the moving person was segmented almost perfectly. The region on the right shows the ghost foreground right after the mug was removed. However, this background change was quickly corrected by frame 1500.

What is claimed is:

1. An adaptive filter comprising:
a data processing component;
an input for receiving video data as input data and for delivering the input data to the data processing component; and
an output for outputting a background model of an image representing by the video data,
the data processing component being operated to produce a model based on Gaussian mixtures by performing steps of:
(i) receiving an input datum;
(ii) based on the input datum, identifying one or more Gaussians in a plurality of Gaussians to be updated; and
(iii) for each Gaussian to be updated, adjusting its parameters using a $$\frac{1}{t}\text{-type}$$

of learning curve having a learning rate which is initially greater than a learning factor $\alpha$ and which converges to $\alpha$ over time.

2. The adaptive filter of claim 1 wherein the $$\frac{1}{t}\text{-type}$$

of learning curve is based on the relation $$\eta(t) = \frac{1-\alpha}{t+1} + \alpha,$$

where $\eta$ is the learning rate.

3. The adaptive filter of claim 1 wherein each of the Gaussians has a corresponding $$\frac{1}{t}\text{-type}$$

of learning curve.

4. The adaptive filter of claim 1 wherein the parameters for each of the Gaussians includes a mean value $\mu_k$ and a standard deviation value $\sigma_k$, where k is the $k^{th}$ Gaussian, wherein the parameters for a Gaussian, $G_k$, are adjusted independently of the parameters of other Gaussians.

5. The adaptive filter of claim 1 wherein the $$\frac{1}{t}\text{-type}$$

of learning curve is based on $$\eta_k(t) = \frac{1-\alpha}{c_k+1} + \alpha$$

for each Gaussian $G_k$ where $c_k$ is indicative of the number of times the $k^{th}$ Gaussian was updated.

6. The adaptive filter of claim 5 wherein the $$\frac{1}{t}\text{-type}$$

of learning curve $\eta_k(t)$ is weighted by $R_k$ for each Gaussian, $G_k$, where $R_k$ is a metric indicative of the contribution of the $k^{th}$ Gaussian to modeling of the input datum.

7. The adaptive filter of claim 1 wherein the step of identifying includes evaluating each Gaussian by computing one or more metrics based on the input datum and the Gaussian being evaluated, the metrics including computing one of a probability $g_k(x)$, a weighted probability $w_k \cdot g_k(x)$, and a normalized $w_k \cdot g_k(x)$, where x is the input datum.

8. The adaptive filter of claim 1 wherein the step of identifying includes a winner-take-all determination, wherein only one of the Gaussians is selected for updating.

9. In a digital processing device, the digital processing device being operated to preform a method for modeling the background of an image represented by the video data comprising:
initializing parameters for one or more Gaussian distributions;
receiving a stream of video data as input data; and
for each input datum:
identifying one or more Gaussian distributions to be updated;
for each Gaussian to be updated, adjusting its parameters based on a $$\frac{1}{t}\text{-type}$$

of learning curve having a learning rate that varies over time, has an initial value greater than a learning factor $\alpha$, and converges to $\alpha$, wherein each Gaussian has its corresponding $$\frac{1}{t}\text{-type}$$

of learning curve,
thereby producing a model of the background of the image represented by the video data.

10. The method of claim 9 wherein each corresponding $$\frac{1}{t}\text{-type}$$

of learning curve is defined by $$\eta_k(t) = \frac{1-\alpha}{c_k+1} + \alpha$$

for each Gaussian $G_k$ where $c_k$ is incremented by a certain amount each time the $k^{th}$ Gaussian is updated.

11. The method of claim 10 wherein $\eta_k$ is weighted by a metric $R_k$ indicative of the contribution of the $k^{th}$ Gaussian to modeling of the input datum.

12. The method of claim 9 wherein the parameters of a Gaussian are adjusted independently of the parameters of other Gaussians.

13. The method of claim 9 wherein the parameters include a mean and a standard deviation, wherein the $\frac{1}{t}$-type of learning curve is based on the relation $$\eta_k(t) = \left(\frac{1-\alpha}{c_k+1} + \alpha\right)$$

for each Gaussian $G_k$ where $c_k$ is incremented by a certain amount each time the $k^{th}$ Gaussian is updated, wherein an adjusted mean and an adjusted standard deviation are computed as a function of $\eta_k$.

14. The method of claim 13 wherein the adjusted mean and the adjusted standard deviation are further a function of a metric $R_k$ indicative of the contribution of the $k^{th}$ Gaussian to modeling of the input datum.

15. A computer program product for modeling the background of an image represented by the video data using a Gaussian mixture comprising:
a storage medium containing computer program code, the computer program code suitable for operating a digital processing unit,
the computer program code comprising:
first computer code configured to operate the digital processing unit to obtain video data as an input datum;
second computer code configured to operate the digital processing unit to identify one or more Gaussians to be updated; and
third computer code configured to operate the digital processing unit to adjust parameters of each Gaussian identified for updating, including computer code to perform one or more computations using a learning rate based on a $\frac{1}{t}$ type of learning curve characterized by having an initial learning rate which is greater than a learning factor $\alpha$ and which converges to $\alpha$ as additional input data is obtained.

16. The computer program product of claim 15 wherein each Gaussian has its corresponding $\frac{1}{t}$ type of learning curve.

17. The computer program product of claim 15 wherein each Gaussian, $G_k$, has a corresponding $\frac{1}{t}$ type of learning curve that is defined by $$\eta_k = R_k \cdot \left(\frac{1-\alpha}{t_k+1} + \alpha\right)$$

for each Gaussian $G_k$ where $c_k$ is incremented by a certain amount each time the $k^{th}$ Gaussian is updated.

18. The computer program product of claim 17 wherein $\eta_k$ is weighted by a metric $R_k$ indicative of the contribution of the $k^{th}$ Gaussian to modeling of the input datum.

19. The computer program product of claim 15 wherein the second computer code identifies Gaussians for updating based on one of a probability $g_k(x)$, a weighted probability $w_k \cdot g_k(x)$, and a normalized $w_k \cdot g_k(x)$, where x is the input datum and k is the $k^{th}$ Gaussian being considered for updating.

* * * * *